US012043957B2

(12) United States Patent
Martens et al.

(10) Patent No.: US 12,043,957 B2
(45) Date of Patent: Jul. 23, 2024

(54) PROCESS FOR MANUFACTURING AN UPGRADED BIO-OIL FROM BLACK LIQUOR

(71) Applicant: Huntsman International LLC, The Woodlands, TX (US)

(72) Inventors: Johan Martens, Sint-Joris-Weert (BE); Sambhu Radhakrishnan, Heverlee (BE); Loes Verheyden, Aarschot (BE); Arend Jan Zeeuw, Wassenaar (NL); Bart De Waele, Heverlee (BE); Robert Henry Carr, Bertem (BE); Nathalie Meyer, Woluwe St. Lambert (BE)

(73) Assignee: HUNTSMAN INTERNATIONAL LLC, Woodlands, TX (US)

( * ) Notice: Subject to any disclaimer, the term of this patent is extended or adjusted under 35 U.S.C. 154(b) by 203 days.

(21) Appl. No.: 17/637,497

(22) PCT Filed: Aug. 27, 2020

(86) PCT No.: PCT/EP2020/074025
§ 371 (c)(1),
(2) Date: Feb. 23, 2022

(87) PCT Pub. No.: WO2021/043671
PCT Pub. Date: Mar. 11, 2021

(65) Prior Publication Data
US 2022/0290370 A1    Sep. 15, 2022

(30) Foreign Application Priority Data
Sep. 2, 2019   (EP) .................................... 19194830

(51) Int. Cl.
| | | |
|---|---|---|
| *D21C 11/00* | (2006.01) | |
| *B01J 21/12* | (2006.01) | |
| *B01J 35/66* | (2024.01) | |
| *C10G 1/08* | (2006.01) | |
| *D21C 11/06* | (2006.01) | |
| *D21C 11/10* | (2006.01) | |
| *D21C 11/12* | (2006.01) | |

(52) U.S. Cl.
CPC ........... *D21C 11/0007* (2013.01); *B01J 21/12* (2013.01); *B01J 35/66* (2024.01); *C10G 1/086* (2013.01); *D21C 11/06* (2013.01); *D21C 11/10* (2013.01); *D21C 11/125* (2013.01); *C10G 2300/1014* (2013.01)

(58) Field of Classification Search
CPC ......... B01J 21/12; B01J 35/108; C10G 1/086; C10G 2300/1014; D21C 11/007; D21C 11/06; D21C 11/10; D21C 11/125; Y02P 30/20
See application file for complete search history.

(56) References Cited

U.S. PATENT DOCUMENTS

| | | | | |
|---|---|---|---|---|
| 2003/0116290 A1 * | 6/2003 | Davidson | ............... | D21C 11/10 |
| | | | | 162/29 |
| 2013/0232852 A1 | 9/2013 | Peterson et al. | | |
| 2013/0324772 A1 | 12/2013 | Huber et al. | | |
| 2013/0327627 A1 | 12/2013 | Daugaard et al. | | |

FOREIGN PATENT DOCUMENTS

| | | | | | |
|---|---|---|---|---|---|
| CN | 104557415 A | * | 4/2015 | | |
| CN | 108017489 A | * | 5/2018 | ............... | C07C 1/20 |
| WO | 2009/135999 A1 | | 11/2009 | | |
| WO | 2014/146128 A1 | | 9/2014 | | |
| WO | 2016/046161 A1 | | 3/2016 | | |
| WO | 2016/046163 A2 | | 3/2016 | | |
| WO | WO-2016046163 A2 | * | 3/2016 | ............... | B01J 29/40 |

OTHER PUBLICATIONS

English-language machine translation of CN 108017489A (Year: 2018).*
English-language machine translation of CN 104557415A (Year: 2015).*
International Search Report and Written Opinion received in corresponding PCT Application PCT/US2020/074025 completed Nov. 5, 2020 and mailed Nov. 19, 2020.

* cited by examiner

*Primary Examiner* — James C Goloboy
(74) *Attorney, Agent, or Firm* — HUNTSMAN INTERNATIONAL LLC; Lewis Craft

(57) ABSTRACT

The present invention relates to a process for manufacturing an upgraded bio-oil derived from black liquor, comprising the following steps: —Providing black liquor, which comes from the pulp and paper manufacturing industry; —Subjecting black liquor to a pyrolysis treatment with formation of a pyrolyzed black liquor gas and a solid mass, which comprises char and salts; —Catalytic conversion of said pyrolyzed black liquor gas by contacting at least part of the latter with a bi-metallic modified zeolite catalyst with formation of the upgraded bio-oil, which comprises benzene, toluene, xylene (BTX), naphthalene and non-BTX products.

16 Claims, No Drawings

PROCESS FOR MANUFACTURING AN UPGRADED BIO-OIL FROM BLACK LIQUOR

CROSS-REFERENCE TO RELATED APPLICATIONS

This application is the National Phase of International Application PCT/EP2020/074025 filed Aug. 27, 2020 which claims priority to European Provisional Application EP19194830.6 filed Sep. 2, 2019. The noted applications are incorporated herein by reference.

The present invention relates to a process for manufacturing an upgraded oil deriving from black liquor, which comes from the pulp/paper manufacturing industry.

Wood comprises cellulose fibers, hemicelluloses and lignin, which binds the fibers together in the natural state of wood. Lignin can be isolated by applying known processes.

Typically, digestion of wood consists in using heat and chemicals. The Kraft process is an example of treatment, wherein wood (chips) are mixed with alkaline digesting liquor in a digester. This reaction leads to the formation of pulp and a liquid, which is called black liquor, forming the soluble part of the obtained mixture. After the digestion process, the obtained pulp and black liquor are separated from each other and further treated separately. Black liquor can be used as the basis to provide valuable products and the pulp, which comprises cellulose fibers, is typically treated further to make paper.

Black liquor comprises water, lignin, hemicelluloses, inorganic salts, and other extracted compounds. Black liquor can be treated further by burning it in specific recovery boilers for energy production or used for manufacturing an upgraded bio-oil.

In scientific literature, it is disclosed that small aromatic compounds, such as benzene, toluene, xylenes (BTX), represent valuable starting materials for a large number of applications. Mixtures of such compounds can be found in aromatic fuels, including gasoline. Benzene can also be used in the production of ethyl benzene and also for nitrobenzene, subsequently to be made into aniline for use in making the well-known MDI/PMDI types of aromatic polyisocyanates. Toluene has found application as a solvent, e.g. in paints, printings inks and glues. Toluene is also used for the preparation of toluene diisocyanate, which is a starting material for the production of polyurethane foams. It can also be used in its disproportionation to benzene and xylene. p-xylene is used in the preparation of terephthalic acid, which is a monomer for several plastics, such as aramid and polyesters, such as polyethylene terephthalate (PET). o-Xylene is mainly used in the production of plasticizers for PVC.

Currently, these aforementioned aromatic compounds (BTX) are produced via refinery processing of fossil fuels. Common processes include steam cracking, steam reforming and catalytic reforming.

WO 2016046163 discloses a process for the preparation of BTX from black liquor. In this process, a pyrolysis treatment is applied first and is followed by a catalytic conversion. The catalyst can be a zeolite catalyst. However, the process does not allow enough BTX to be produced from black liquor.

There is a need to provide a more environmentally friendly process of manufacturing these aromatic compounds, while producing a higher amount of BTX from black liquor.

It is an object of the present invention to overcome the aforementioned drawbacks by providing a process of manufacturing an upgraded bio-oil, which derives from black liquor, while ensuring an environmentally friendly manufacturing process.

In this respect, the present invention provides a process for manufacturing an upgraded bio-oil derived from black liquor, comprising the following steps:

Providing black liquor, which comes from the pulp/paper manufacturing industry;

Subjecting black liquor to a pyrolysis treatment with formation of a pyrolyzed black liquor gas and a solid mass, which comprises char and salts;

Catalytic conversion of said pyrolyzed black liquor gas by contacting at least part of the latter with a bi-metallic modified zeolite catalyst with formation of the upgraded bio-oil, which comprises benzene, toluene, xylene (BTX), naphthalene and non-BTX products.

In the present invention, it has been unexpectedly discovered that the use of bi-metallic modified zeolite catalyst positively contributes to the aromatization of black liquor into BTX. Valuable products can be produced from BTX, as explained above.

Moreover, the present invention enables improving the ratio of BTX to other components of the upgraded bio-oil, which is particularly advantageous in the context of the invention.

According to a preferred embodiment, black liquor of the present invention results from a biomass or an alkaline treatment of wood.

Advantageously, a first metal and a second metal are incorporated into said catalyst, which is provided as a support catalyst.

The combination between said zeolite catalyst and the two metals improves the catalytic reaction, and thereby the conversion of black liquor into BTX.

More advantageously, said first metal is a transition metal selected from Group IIB of the periodic table and said second metal consists of:

a. One metallic element selected from the Lanthanide series of the periodic table having an atomic number ranging from 57 to 60; or b. A transition metal of Group IB of the periodic table; or c. A transition metal of Group VIB of the periodic table.

It has been discovered that the selection of the two metals can improve the upgrade of the bio-oil, in terms of the amount of BTX obtained in the end of the process, which is particularly preferred.

According to one embodiment of the present invention, said support catalyst has a silica alumina molar ratio from 5 to 300, preferably from 10 to 150, more preferably from 20 to 90, even more preferably equal to 23, 30, 45 or 80.

The silica alumina molar ratio (SAR) is relevant for the potential acidity of the catalyst. At a low SAR and if virtually all the active sites have been rendered in the W form, the resulting catalyst is very acidic.

Preferably, the support catalyst, ZSM-5, has an internal pore size distribution in the range of 4.5 to 12 Å, preferably from 5 to 7 Å.

More preferably, said catalyst has a metal loading between 0.1-10 wt %, preferably between 0.5-5 wt % on metal basis, this being optimum in terms of improved catalyst performance versus amount of metal used.

In a preferred embodiment, the process according to the invention is an ex situ catalytic pyrolysis process, wherein said pyrolysis treatment is carried out in an upstream pyrolysis reactor and said catalytic conversion is performed in a downstream catalysis reactor.

This embodiment is convenient for the user since during pyrolysis, a gas is formed and then it passes through for example a bed of the catalyst, in order to be converted into BTX, which is then recuperated as an upgraded oil by condensation.

Advantageously, said pyrolysis treatment and/or said catalytic conversion is performed in an inert atmosphere.

Suitable inert atmosphere can be nitrogen, argon, helium and the like. Nitrogen is preferred.

More advantageously, the pyrolysis treatment of black liquor is carried out at a temperature of 350° C. to 700° C., preferably at a pressure of between 0.1 to 6 bara.

The catalytic conversion preferably occurs at a temperature ranging from 200° C. to 1000° C., preferably from 350° C. to 650° C.

According to a particular embodiment, said black liquor is concentrated in a multistage evaporation process, in order to obtain a concentrated black liquor containing between 10 and 35 wt % of water.

The process for concentration of the solid content of black liquor is commonly performed in existing pulp and paper mills.

Suitable black liquors are derived using both the Kraft and Soda processes from many types of wood, such as eucalyptus hardwood, southern hardwood, northern hardwood, northern softwood, southern softwood.

According to a particular embodiment of the present invention, said upgraded bio-oil has a BTX/naphthalene weight ratio of up to 50, preferably up to 40, more preferably up to 35, even more preferably up to 25, advantageously up to 15.

Preferably, wherein compounds or salts comprising said first metal and said second metal are both mixed and thereby incorporated into said support catalyst.

Applying such process enables having better results in terms of BTX/naphthalene weight ratio compared with a system, where the first metal is incorporated into a first support catalyst and the second metal is incorporated into a second support catalyst.

In the present invention, we can use more than one catalyst in the context of the present invention for performing the catalytic reaction.

Advantageously, said catalytic conversion is performed until substantial (e.g., more than 90%) preferably complete deoxygenation of said upgraded bio-oil is reached as determined using gas chromatography on the produced bio-oil.

Gas chromatographic methods can be used to identify and quantify any residual oxygen-containing components of the produced bio-oil.

Other embodiments of the process of the present invention are mentioned in the annexed claims.

The process of the present invention can be integrated in an existing pulp (and paper mill), in a way that e.g. energy and salts can still be recovered for further use in the pulp and paper industry.

The advantage of the process of the present invention is linked to the fact that it can be integrated in an existing pulp (and paper mill, in a way that e.g. energy and salts can still be recovered for further use in the pulp and paper industry.

According to this invention, "black liquor" is the soluble part that is present after wood has been treated with the Kraft or Soda anthraquinone (Soda-AQ) process. In these types of processes, black liquor derives from alkaline treatment of wood (wood can be wood chips). In the well-known Kraft process, a basic mixture of sodium hydroxide and sodium sulfide is used. In the Soda-AQ process, sodium hydroxide is commonly used. Anthraquinone can be used as a pulping additive to decrease the carbohydrate degradation. In both processes, additional salts can be added, such as potassium salts of sulfide, sulfate, thiosulfate, sulfite, carbonate, chloride, lignate, soaps and sugar acids and/or silicate. Also, lesser amounts of calcium, magnesium salts can also be found, probably as organic complexes. The salt can also comprise traces of many other cations, and silica. The alkaline solution used for the alkaline treatment is added to the wood, which is digested in a digester so that the bonds, which link lignin to the cellulose break down. This results in cellulose pulp and a liquid. Cellulose pulp is insoluble in the basic environment and the obtained liquid is black liquor. Black liquor comprises lignin, lignin fragments, hemicellulose, carbohydrates from the breakdown of hemicellulose, sodium carbonate, sodium sulfate and other inorganic salts and water. The salt in black liquor substantially derives from the alkaline treatment of wood.

Typically, black liquor can have 15 wt % of solids. However, preferably concentrated black liquor is used in the invention, where the solids concentration is between 65 wt % and 90 wt %. The wording "black liquor" used in the context of the present invention can be replaced by the expression "concentrated black liquor", unless it is otherwise specified.

In one embodiment, black liquor can come from hardwood or softwood. Most preferably, black liquor is derived from hardwood. Hardwood is wood from angiosperm trees. A suitable example of hardwood is wood coming from poplar, amongst which hybrid poplar. Softwood is wood from gymnosperm trees. Suitable examples of softwood are woods coming from pines.

In the context of the invention, the expression 'bi-metallic modified zeolite catalyst' should be understood as being one zeolite catalyst modified with a first metal and a second metal. However, this expression can also mean that a first zeolite catalyst is impregnated with a first metal and a second zeolite catalyst is impregnated with a second metal. Said first and second zeolite catalyst will then be put together in a reactor for performing the catalytic conversion.

The bi-metallic modified zeolite catalyst used in the context of the invention is a bi-metallic modified zeolite catalyst, which can be provided by incorporating a first and second metal into said catalyst.

Preferably, said first metal is a transition metal selected from Group IIB of the periodic table. According to a particularly preferred embodiment, Zinc (Zn) can be used as the first metal.

In the present invention, said first metal of the invention is combined with a second metal, which can be selected amongst three groups of metal elements.

The first group of elements consists of the Lanthanide series of the periodic table having an atomic number ranging from 57 to 60. Cerium (Ce) will be preferred in the context of the present invention for the second metal.

One possible combination can therefore be a bi-metallic modified zeolite containing Zn and Ce.

In a particularly preferred embodiment, the catalyst used in the invention is ZSM-5.

Advantageously, ZSM-5, more advantageously H-ZSM-5, is impregnated with Zn and Ce.

Suitable bi-metallic modified zeolite catalysts can also be obtained by directly mixing compounds or salts comprising Zn and Ce and thereby incorporating both metals into H-ZSM-5.

According to a preferred embodiment, Zn can be incorporated into a first zeolite catalyst, such as ZSM-5, preferably H-ZSM-5, and Ce can be incorporated into a second zeolite catalyst, such as ZSM-5, preferably H-ZSM-5.

The second group of elements can be a transition metal of Group IB of the periodic table. Silver (Ag) will be preferred in the context of the present invention for the second metal.

A bi-metallic modified zeolite containing Zn and Ag is a particularly preferred embodiment.

Preferably, the zeolite catalyst used in the invention is ZSM-5, more preferably H-ZSM-5.

Advantageously, ZSM-5, more advantageously H-ZSM-5, is impregnated with Zn and Ag.

Suitable bi-metallic modified zeolite catalysts can also be obtained by directly mixing compounds or salts comprising Zn and Ag and thereby incorporating both metals into H-ZSM-5.

According to a preferred embodiment, Zn can be incorporated into a first zeolite catalyst, such as ZSM-5, preferably H-ZSM-5, and Ag can be incorporated into a second zeolite catalyst, such as ZSM-5, preferably H-ZSM-5.

The third group of elements can be a transition metal of Group VIB of the periodic table. Molybdenum (Mo) will be preferred in the context of the present invention for the second metal.

A bi-metallic modified zeolite containing Zn and Mo is a particularly preferred embodiment.

Preferably, the zeolite catalyst used in the invention is ZSM-5, more preferably H-ZSM-5.

Advantageously, ZSM-5, more advantageously H-ZSM-5, is impregnated with Zn and Mo.

Suitable bi-metallic modified zeolite catalysts can also be obtained by directly mixing compounds or salts comprising Zn and Mo and thereby incorporating both metals into H-ZSM-5.

According to a preferred embodiment, Zn can be incorporated into a first zeolite catalyst, such as ZSM-5, preferably H-ZSM-5, and Mo can be incorporated into a second zeolite catalyst, such as ZSM-5, preferably H-ZSM-5.

In the example section, it can be noticed that bi-metallic modified zeolite catalysts made of Zn—Ce—H-ZSM-5 or Zn—Ag—H-ZSM-5 give even better results in terms of the weight ratio of BTX/naphthalene, compared to Zn—Mo—H-ZSM-5.

One example of catalyst preparation procedure followed in the present invention is metal loading via incipient wetness impregnation and calcination at 550° C. Since the catalyst needs to be in acid form (H-form) for the reaction, metal loading needs to be performed preferably on H-form or NH4-form. Loading on NH4-form is also possible, as it will convert to H-form during pre-treatment/calcination.

According to this invention, an upgraded bio-oil is obtained. In the scientific literature, this expression can also be linked to "small aromatic compounds", which are mono-aromatic compounds comprising one aromatic ring, which can be substituted, and oligomeric aromatic compounds comprising two or three aromatic ring structures, which can be substituted. Examples of the small aromatic compounds are benzene, toluene, ortho-xylene, meta-xylene and para-xylene, trimethylbenzene, ethylbenzene, diethylbenzene, tri-ethylbenzene. An example of an oligomeric aromatic compound is naphthalene, which can be substituted.

The upgraded bio-oil is a valuable product, since amongst the components that it contains, BTX can be collected for further use. Naphthalene (and other non-BTX products) is also obtained, and it is used here as a reference to determine the amount of BTX produced by the process of the present invention.

The present invention relies on the application of pyrolysis treatment and catalytic treatment of black liquor, in order to produce an upgraded bio-oil.

The process involved can relate to ex situ or in situ treatment of said black liquor.

Ex situ treatment refers to a process, wherein pyrolysis is applied in a first reactor and is followed by catalytic conversion carried out in a second reactor, whereas in situ treatment refers to the application of pyrolysis and catalytic reaction in one single reactor.

Both options are possible in the context of the invention, even if ex situ treatment will give better results, when the process is applied at industrial scale.

During the pyrolysis treatment, the temperature should be enough to pyrolyze black liquor. Pyrolysis in this context of the invention means a thermo-chemical process, wherein the heat is introduced into the process substantially via a solid substrate where no external oxygen is present and due to the heat black liquor decomposes. Preferably, the temperature during the pyrolysis is sufficiently low so that the solid substrate remains solid and the salts present in the solid substrate do not melt, typically below 650°. Preferably, the pyrolysis treatment of black liquor is carried out at a temperature of 350° C. to 700° C., preferably a pressure of 0.1 to 6 bara.

During pyrolysis, catalyst is preferably not added to the reactor, except for the material (such as salt) that is already present in black liquor due to the preparation of black liquor. It might be possible that the salts present in black liquor have a catalytic activity during the pyrolysis.

Advantageously, during pyrolysis, catalyst is not added to the reactor. In other words, black liquor is subjected to a pyrolysis treatment, without the presence of a catalyst, with formation of a pyrolysed black liquor gas and a solid mass, which comprises char and salts.

Black liquor flows through the pyrolysis reactor at a velocity such that the solid substrate is carried up in the reactor. Preferably, the vapors produced during pyrolysis, with or without the addition of an additional fluidizing gas are such that the black liquor and the solid substrate are fluidized in the reactor. The fluidizing gas is preferably an inert gas such as $N_2$, recycled non-condensable gases separated later in the process, or steam. Preferably, reactive gasses, such as air, $O_2$, methane are avoided during the pyrolysis (or even during catalytic conversion), since these can cause secondary reactions, which are not desired in the context of the invention.

Through the heat introduced by the solid substrate, black liquor pyrolyzes and breaks down to char and pyrolyzed black liquor gas. The char is part of the solid mass, which can be further used as a solid substrate. The pyrolyzed black liquor gas flows through the reactor and the solid mass becomes entrained in the pyrolyzed black liquor gas flow.

Subsequently, the solid mass and the pyrolyzed black liquor gas can be separated. This can be done by any known method to separate a gas from a solid. Such methods include filtering, electrostatic separation and separation by inertia or a combination thereof. Preferably the first separation of the gas is performed using inertia. This technique is based on the recovery of solid particles by a change of direction of the solids-containing gas flow. This can be achieved by static separators. However, this is commonly better obtained by using centrifugal forces, e.g. in one or more cyclones.

As described, preferably the solid mass obtained after pyrolysis comprising char and salt, is collected and can be used in a recovery boiler.

It has been found that the pyrolyzed black liquor gas comprises syngas (i.e. CO, $CO_2$, $H_2$), hydrocarbons with olefinic unsaturation, organic and aromatic compounds that contain oxygen, such as phenols, methoxyphenols and to a minor extent ketones, alcohols, ethers such as furanics, carboxylic acids etc., which compounds may be originating from the (hemi)cellulose fraction present in black liquor. As described, the inventors found that these compounds and other compounds in the pyrolyzed black liquor gas can be converted into a bio-oil containing BTX, naphthalene and non-BTX products.

After pyrolysis, the pyrolyzed black liquor gas is preferably contacted with a bi-metallic modified zeolite catalyst. During this step, a catalytic conversion occurs and provides the upgraded bio-oil of the present invention. The contact of the pyrolyzed black liquor gas with the bi-metallic modified zeolite catalyst can occur in a reactor which is in connection with the pyrolyzing reactor, e.g. through pipes. Preferably, the pyrolyzed black liquor gas is in contact with the catalyst, directly after the pyrolysis step, optionally after separation, without first being stored and/or cooled down.

In addition, after the gas is in contact with the bi-metallic modified zeolite catalyst, the upgraded bio-oil is obtained by condensation.

The catalytic conversion can also be carried out, in the presence of additives. Phosphor can be used to increase the hydrothermal stability of the catalyst. Also other trivalent rare earth elements can be used (e.g. europium). The catalyst can also have an acidity gradient that changes in function of the distance to the zeolite surface and can be more or less acidic at the surface versus the core of the catalyst. The gradient can be a consequence of the synthesis procedure or post synthesis treatment, e.g. treatment of the catalyst with steam.

The catalytic conversion is suitably carried out at a temperature in the range of 200 to 1000° C. Relatively high temperatures, such as 350 to 650° C. are preferred since they tend to increase the formation of aromatic compounds from the vaporous phase. The pressure suitably ranges from 1 to 4 bara. During catalytic conversion, the catalyst is suitably present in a weight ratio of pyrolyzed black liquor gas to catalyst in the range of 5:1 to 1:20, and more preferably in the range of 1:1 to 1:5.

The catalytic conversion of the present process may be carried out in a fixed bed. The pyrolyzed black liquor gas can be passed through the bed in an up-flow or a down-flow direction. However, since the conversion to aromatic compounds may result in some coke deposition on the catalyst, a gradual deactivation may take place in such a fixed bed. Therefore, it is also possible to conduct the conversion treatment in a moving or fluidized bed. In a fluidized bed the catalyst is continuously added and passed in a fluidized way to an exit whilst being surrounded by vapors. The vapors comprise initially the vapors from the pyrolyzed black liquor gas (which comprises phenols and other oxygenated compounds) and will be converted over time to small aromatic compounds that are largely deoxygenated. Then, the catalyst is separated from the vapors and may then be passed to a regenerator, where it is subjected to contact with an oxygen-containing gas to remove any coke deposited on the catalyst. The skilled person will be familiar with the concept of catalyst regeneration in a fluid bed arrangement. The regeneration is more effective, when the catalyst is impregnated with metal.

The catalyst that is thus regenerated may, typically continuously, be recycled to the conversion treatment.

After the catalytic conversion treatment, an upgraded bio-oil is formed, which comprises BTX, naphthalene and non-BTX products.

BTX can then be recovered from the upgraded bio-oil. The skilled person will realize that it is feasible to recover the various aromatic compounds separately. Alternatively, it is feasible to recover all aromatic compounds in one fraction. The skilled person will adopt the desired level of fractionation in accordance with the needs and uses of the aromatic compounds.

The upgraded bio-oil also contains some by-products, such as olefins. It is sometimes desired to recover the olefins separately from the aromatic compounds. Also, other byproducts, such as alkanes, such as methane, hydrogen, carbon monoxide, carbon dioxide and water can be present after the catalytic conversion. Some of these may be condensed and form part of the bio-oil whilst others may be kept as a further vapor stream for further additional use, for example, to be separated and collected separately or used as a fuel component in the industrial facility. Therefore, the upgraded bio-oil can be subjected to fractionation for collecting a BTX fraction. The remaining fraction comprising other aromatic compounds, olefin fractions, and residue can be collected further, if needed separately.

The residue may be combusted to yield energy for the heating of the various feed streams and intermediate products. At least part of the one or more olefin fractions may be recycled to the catalytic conversion treatment. It is also possible to recycle at least part of the one or more olefins fractions to the pyrolysis treatment. Also, at least part of the olefins fraction may be recycled to the conversion treatment and to the pyrolysis treatment. At least part of the one or more olefins fractions may be recycled to either one of the pyrolysis treatment and the conversion treatment or to both. Furthermore, the residue can also be catalytically converted to a second conversion product enriched in small aromatic compounds in a follow-up reactor. Gasses such as water gas and alcohols in gas form can be added to the residue which may help in forming the small aromatic compounds.

A suitable method for recovering BTX from the upgraded bio-oil consists in passing the upgraded bio-oil into an extraction column. A liquid hydrocarbon is sprayed on the upgraded bio-oil, thereby cooling the latter and providing a solvent for the aromatic compounds. Oxygen containing compounds, such as formic acid, propionic acid, etc., including water that may be formed during the process, easily separate from the mixture of the upgraded bio-oil and liquid hydrocarbon. In this way the aromatic hydrocarbons are recovered together with the liquid hydrocarbon. After separation of the liquid hydrocarbon phase that contains the aromatic compounds from the phase that comprises oxygen-containing compounds, including water, the liquid hydrocarbon phase is suitably subjected to fractionation to obtain BTX.

Experimental Procedure

The experiments are performed on a Frontier Lab Tandem μ-Reactor (TMR) (model Rx-3050TR) equipped with an upper pyrolysis reactor and a lower catalysis reactor. Product analysis is performed with gas chromatography (GC) using a Thermo Fischer Trace GC 1300 equipped with an FID detector and Ultra Alloy+-1 GC column (length 30 m; id 0.25 mm; film thickness 2 μm). The TMR is connected to the mounting dock of the GC and connected to the injector via an adapted injection module through a rubber septum. Nitrogen gas enters from the top of the upper reactor, providing carrier gas flow through the upper and lower reactors into the GC.

About 0.5 cm deactivated quartz wool is placed at the bottom of an open-ended quartz tube with approximately 40 mg of quartz beads (size 125-250 μm) above that, on top of which approximately 25 mg of catalyst pellets are placed. Another plug of quartz wool is then placed on top. This arrangement keeps the catalyst bed compact and at a consistent height in all experiments. This quartz tube is placed inside the second, lower reactor of the TMR. The reactor is pressurized to 300 kPa with nitrogen gas to check for leakage after which the nitrogen flow is adjusted to 1 ml/min for the final analysis. The temperature of the pyrolysis reactor is set at 500° C., the catalysis reactor is set at 550° C. for the experiments. The interfaces between the reactors and between the TMR and GC are both heated up to 320° C.

Approximately 5 mg of black liquor from a Kraft paper process using Northern Softwood (organic content ca. 37 wt %) and a small amount of internal standard (pyrene) are weighed into a stainless-steel cup with a hook and the sample holder is attached to the sample injector, which hangs slightly above the first reactor. The cup is dropped into the first reactor at the pyrolysis temperature and the pyrolysis reaction is started. The vapor products generated by pyrolysis in the upper pyrolysis reactor flow through the catalyst bed in the lower catalyst reactor before entering the GC for analysis.

A commercial microporous material zeolite, H-ZSM-5 (CBV3024E, Zeolyst, SiO2/Al2O3=30), was used as the catalyst/support for metal loading. Metal loaded samples were prepared by an incipient-wetness impregnation method and the metal loading was approximately 3 wt % (on a metal basis). Metal precursors used were nickel chloride, gallium nitrate, ammonium phosphomolybdate, zinc chloride, silver nitrate, copper nitrate, manganese chloride and cerium nitrate. For the reactions, catalyst powder was compressed into wafers which were crushed and sieved to obtain pellets of 125-250 μm.

Bimetallic catalysts can preferably be prepared by calcining $NH_4$-form of the zeolite at 550° C. for 6 h to convert to H-form. Metal loading can be performed via incipient wetness impregnation method. Salts of the metal to be impregnated, namely zinc chloride, silver nitrate, cerium nitrate, ammonium phosphomolybdate, gallium nitrate, manganese chloride, copper nitrate, can be used as the metal precursors. Solutions of the metal salts were prepared, and calculated amounts were used to impregnate the H-form of the zeolite to obtain 3 wt % metal basis for monometallic catalysts and 1.5 wt % for each metal for bimetallic catalyst. Approximately 500 μl of the metal salt solution was used to impregnate ca. 1 g of the zeolite. Metal solution impregnated catalysts were dried at 60° C. for 16 h, followed by calcination in air at 550° C. for 6 h (room temperature till 550° C. at 1° C./minute and hold for 6 h).

The method used for the GC analysis is as follows: start at 40° C., hold for 5 minutes; heat up to 150° C. at 5° C./min, heat up to 300° C. at 10° C./min and keep at 300° C. for 20 minutes. A split ratio of 12.5 is used to dilute the injected sample. The GC is operated under constant flow method, with the column flow set at 1 ml/min. To improve the resolution of the GC chromatogram, a cold trap working with liquid nitrogen (Temperature at about −196° C.) is installed at the beginning of the GC column, comprising approximately the first 7 cm of the column, which is cooled for 4 minutes at the start of the procedure. By introducing this cold trap, the fast formed and most volatile ("light") products of the pyrolysis are trapped and then evaporated when temperature increases according to the GC temperature ramp.

Results are reported here as the average of more than one experimental run and comparisons between catalysts are made only from experiments carried out within a restricted time period. Naphthalene is a major component of the complex hydrocarbon mixtures produced in these experiments and will be used as the indicator of non-BTX products. Catalytic performance in terms of production of BTX versus non-BTX products will be evaluated based on BTX/Naph ratios (wt %/wt %).

Example 1

| Test | Catalyst | First metal - Zn (wt %) | Second metal (wt %) | BTX/ naphthalene |
|---|---|---|---|---|
| 1 | Zn—Ce/H-ZSM-5 | 1.5 | 1.5 | 9.86 |
| 2 | Zn—Ag/H-ZSM-5 | 1.5 | 1.5 | 8.84 |
| 3 | Zn—Mo/H-ZSM-5 | 1.5 | 1.5 | 7.66 |

Tests 1-3 correspond to an embodiment, where Zn is combined with a second metal, respectively Ce, Ag and Mo.

Example 2

| Test | Catalyst | First metal - Zn (wt %) | Second metal (wt %) | BTX/ naphthalene |
|---|---|---|---|---|
| 4 | Zn—Ag/H-ZSM-5 | 1.5 | 1.5 | 10.07 |
| 5 | Ag/H-ZSM-5-Zn/H-ZSM-5 | 1.5 | 1.5 | 7.97 |

Test 5 is performed by having a first catalyst impregnated with Ag and a second catalyst impregnated with Zn. Then, the first catalyst is placed below with the second catalyst in the reactor.

Example 3

| Test | Catalyst | Molar ratio (Zn/Ce) | First metal - Zn (wt %) | Second metal (wt %) | BTX/ naphthalene |
|---|---|---|---|---|---|
| 6 | Zn—Ce/H-ZSM-5 | 2:1 | 1.5 | 0.37 | 13.09 |
| 7 | Zn—Ce/H-ZSM-5 | 1:1 | 1.5 | 0.73 | 11.74 |
| 8 | Zn—Ce/H-ZSM-5 | 1:2 | 1.5 | 1.46 | 11.36 |
| 9 | Zn—Ce/H-ZSM-5 | 1:2 (half dose) | 0.75 | 0.73 | 10.63 |

Example 4

| Test | Catalyst | Molar ratio (Zn/Ce) | First metal - Zn (wt %) | Second metal (wt %) | BTX/ naphthalene |
|---|---|---|---|---|---|
| 10 | Zn—Mo/H-ZSM-5 | 1:2 | 1.5 | 2.70 | 12.18 |
| 11 | Zn—Mo/H-ZSM-5 | 1:1 | 1.5 | 1.35 | 10.03 |
| 12 | Zn—Mo/H-ZSM-5 | 2:1 | 1.5 | 0.68 | 9.53 |
| 13 | Zn—Mo/H-ZSM-5 | 1:2 (half dose) | 0.75 | 1.35 | 8.31 |

Example 5

| Test | Catalyst | Molar ratio (Zn/Ce) | First metal - Zn (wt %) | Second metal (wt %) | BTX/ naphthalene |
|---|---|---|---|---|---|
| 14 | Zn—Ag/H-ZSM-5 | 1:1 | 1.5 | 1.57 | 10.53 |
| 15 | Zn—Ag/H-ZSM-5 | 2:1 | 1.5 | 0.79 | 10.25 |
| 16 | Zn—Ag/H-ZSM-5 | 1:2 | 1.5 | 3.14 | 9.01 |
| 17 | Zn—Ag/H-ZSM-5 | 1:2 (half dose) | 0.75 | 1.57 | 8.42 |

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

As used herein, the singular forms "a", "an", and "the" include both singular and plural referents unless the context clearly dictates otherwise. By way of example, "a catalyst" means one catalyst or more than one catalyst.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of". This means that, preferably, the aforementioned terms, such as "comprising", "comprises", "comprised of", "containing", "contains", "contained of", can be replaced by "consisting", "consisting of", "consists".

Throughout this application, the term "about" is used to indicate that a value includes the standard deviation of error for the device or method being employed to determine the value.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Throughout this application, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Although the preferred embodiments of the invention have been disclosed for illustrative purpose, those skilled in the art will appreciate that various modifications, additions or substitutions are possible, without departing from the scope and spirit of the invention as disclosed in the accompanying claims.

The invention claimed is:

1. A process for manufacturing an upgraded bio-oil derived from a black liquor, comprising the following steps:
   providing the black liquor;
   subjecting the black liquor to a pyrolysis treatment and forming a pyrolyzed black liquor gas and a solid mass, wherein the solid mass comprises char and salts, and wherein the pyrolyzed black liquor gas comprises oxygenated compounds;
   forming the upgraded bio-oil, which comprises benzene, toluene, xylene (BTX), naphthalene, and non-BTX products, through catalytic conversion of the pyrolyzed black liquor gas by contacting at least part of the pyrolyzed black liquor gas with a bi-metallic modified zeolite catalyst.

2. The process according to claim 1, wherein a first metal of the bi-metallic modified zeolite catalyst is a transition metal selected from Group IIB of the periodic table and wherein a second metal of the bi-metallic modified zeolite catalyst consists of:
   a. one metallic element selected from the Lanthanide series of the periodic table having an atomic number ranging from 57 to 60; or
   b. a transition metal of Group IB of the periodic table; or
   c. a transition metal of Group VIB of the periodic table.

3. The process according to claim 1, wherein a zeolite has a silica alumina molar ratio from 5 to 300.

4. The process according to claim 1, wherein a zeolite of the bi-metallic modified zeolite catalyst has an internal pore size distribution in the range of 4.5 to 12.

5. The process according to claim 1, wherein said bi-metallic modified zeolite catalyst has a metal loading between 0.1-10 wt % on metal basis.

6. The process according to claim 1, being an ex situ catalytic pyrolysis process, wherein said pyrolysis treatment is carried out in an upstream pyrolysis reactor and said catalytic conversion is performed in a downstream catalysis reactor.

7. The process according to claim 1, wherein said pyrolysis treatment and/or said catalytic conversion is performed in an inert atmosphere.

8. The process according to claim 1, wherein the pyrolysis treatment of black liquor is carried out at a temperature of 350° C. to 700° C.

9. The process according to claim 1, wherein the catalytic conversion occurs at a temperature ranging from 200° C. and 1000° C.

10. The process according to claim 1, wherein said black liquor is concentrated in a multistage evaporation process, in order to obtain a concentrated black liquor containing between 20 and 35 wt % of water.

11. The process according to claim 1, wherein said black liquor derived from wood, which is selected from the group consisting of eucalyptus hardwood, southern hardwood, northern hardwood, northern softwood, southern softwood.

12. The process according to claim 1, wherein said upgraded bio-oil has BTX/naphthalene weight ratio of up to 50.

13. The process according to claim 2, wherein compounds or salts comprising said first metal and said second metal are both mixed and thereby incorporated into said zeolite.

14. The process according to claim 1, wherein said catalytic conversion is performed until substantial deoxygenation of said upgraded bio-oil is reached.

15. The process according to claim 1, wherein the first metal is zinc and the second metal is cerium.

16. The process according to claim 1, wherein the first metal is zinc and the second metal is molybdenum.

* * * * *